UNITED STATES PATENT OFFICE.

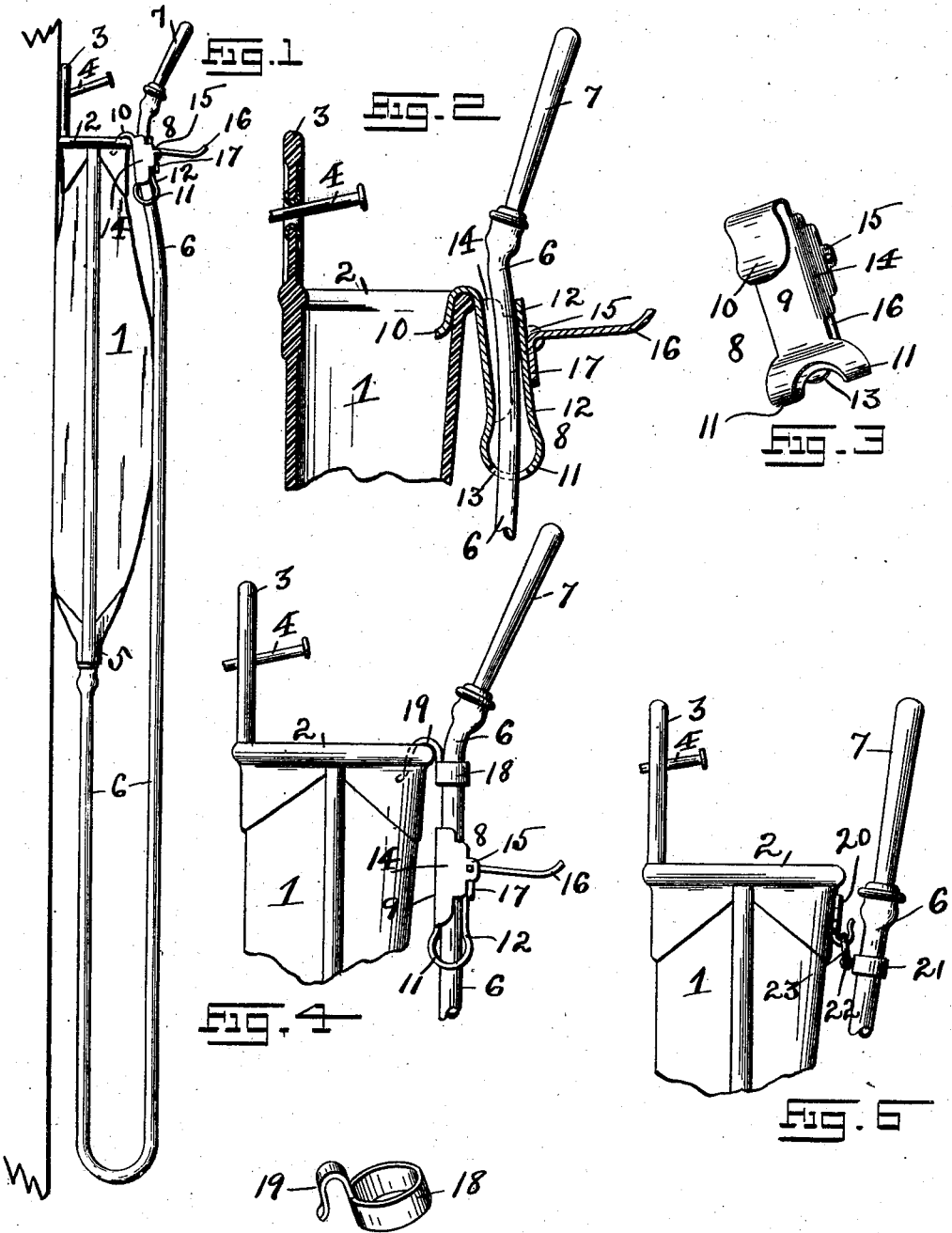

JAMES HARDMAN, JR., OF BELLEVILLE, NEW JERSEY, ASSIGNOR TO HARDMAN RUBBER COMPANY, A CORPORATION OF NEW JERSEY.

FOUNTAIN-SYRINGE.

SPECIFICATION forming part of Letters Patent No. 718,202, dated January 13, 1903.

Application filed September 9, 1902. Serial No. 122,655. (No model.)

*To all whom it may concern:*

Be it known that I, JAMES HARDMAN, Jr., a citizen of the United States, residing at Belleville, in the county of Essex and State of New Jersey, have invented certain new and useful Improvements in Fountain-Syringes; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

The present invention has reference to improvements in fountain-syringes which are generally suspended from a nail driven into the wall or other place. In the use of this class of syringes as now ordinarily made the person after the use of the syringe usually hangs up the conveying tube or hose by placing the nozzle into the mouth or neck of the bag or reservoir. This, however, is a very objectionable feature, for its use causes the flexible tubing to kink, thereby gradually wearing or weakening the tubing or hose at the point where it is placed over the edge of the mouth or neck of the bag or reservoir. To avoid this serious objection is the principal object of the present invention, and with this in view the main purpose of the invention is to provide the delivery tube or hose of the fountain-syringe with a means of suspension adapted to be arranged over the edge of the mouth or neck of the bag or reservoir, whereby when the tube or hose is hung up it is constantly kept straight and any "kinking" of the tube or hose is positively avoided.

A further object of this invention is to provide a novel means in the form of a compression-clamp for compressing the flexible tubing or hose, and thereby shutting off the flow of the liquid through the said tubing or hose.

My invention therefore consists in the novel means of suspension to be employed with the flexible tubing or hose of a fountain-syringe by means of which the kinking of the tubing or hose is entirely avoided.

The invention consists, further, in the novel construction of compression-clamp to be used with the flexible tubing or hose of a fountain-syringe by means of which the tubing or hose may be compressed and the flow of the liquid therethrough entirely shut off.

The invention consists, furthermore, in the various novel combinations of the devices and arrangements of parts, as well as in the details of the construction of the same, all of which will be hereinafter more particularly specified and then finally embodied in the clauses of the claim which are appended to and form a part of this specification.

The invention is clearly illustrated in the accompanying drawings, in which—

Figure 1 is a side view of a suspended fountain-syringe, illustrating the tubing or hose provided with a combined shut-off or compression-clamp and a suspension device arranged over the rim or edge of the bag or reservoir of the fountain-syringe. Fig. 2 is a transverse sectional representation, on a large scale, of the upper portion of the bag or reservoir and the said combined shut-off or compression-clamp and suspension device with the nozzle portion of the tubing or hose in elevation in its suspended position in said device. Fig. 3 is a perspective view of the said combined shut-off or compression-clamp and suspension device. Fig. 4 is a face view of the upper portion of the bag or reservoir and nozzle portion of the tubing or hose, illustrating a modified construction of suspension-hook independent of the shut-off or compression-clamp; and Fig. 5 is a perspective view of the suspension device represented in said Fig. 4. Fig. 6 is a view similar to that represented in said Fig. 4, but illustrating still another modified construction of suspension device, the hook in this case being attached directly to the side of the bag or reservoir and the nozzle portion of the tubing or hose being provided with a ring adapted to be placed over the said hook.

Similar characters of reference are employed in all the said hereinabove-described views to indicate corresponding parts.

In the said drawings the reference character 1 indicates the usual flexible bag or reservoir of a fountain-syringe. 2 is the surrounding edge or rim of the mouth or neck of the said bag or reservoir, and 3 represents the usual loop by means of which the bag or reservoir is suspended from a nail 4 or other supporting means upon the wall or other like place. Connected with the outlet 5 of the said bag or reservoir 1 is the usual flexible tubing or hose 6, which is provided at its free end with a nozzle 7 of any well-known construction.

Referring now to Figs. 1, 2, and 3 of the drawings, the combined shut-off or compression-clamp and suspension device in indicated by the reference character 8, and the same consists, essentially, of a back plate 9, provided at the top with a hook or other suitably-arranged supporting means 10, adapted to be placed over the edge or rim 2 of the said bag or reservoir 1, as shown in Figs. 1 and 2 of the drawings. The opposite and lower portion of the said back plate 9 is bent, as at 11, and extending in an upward direction from said bent part 11 is a spring-tongue 12. The said bent part 11 is also made with an opening 13, into and through which the nozzle end of the tubing or hose 6 is drawn and located between the opposite faces of the said back plate 9 and the spring-tongue 12, as shown. The said back plate 9 is also made with a pair of outwardly-extending ears or lugs 14, arranged at the opposite edges of the said spring-tongue 12 and having their perforated portions 15 projecting beyond the outer face of the said spring-tongue 12. Pivotally arranged between these perforated portions 15 is a clamping-lever 16, provided with a clamping-jaw 17, arranged at an angle, preferably a right angle, to the said lever 16, as shown. This jaw 17 rests directly upon the outer face of the said spring-tongue 12, and when the lever 16 is turned in a downward direction then said jaw 17 forces the said spring-tongue 12 directly against the flexible tubing or hose 6 by the compression of the tubing, shutting off the flow of the liquid through the tubing or hose, as will be clearly understood.

Instead of providing the back plate 9 with a hook 10, as in Figs. 1, 2, and 3, the suspension device and the shut-off or compression-clamp may be made separate, as indicated in Figs. 4 and 5, in which case a collar or band 18 is secured at the desired place upon the flexible tubing or hose, the said collar or band 18 being provided with a hook 19, which can be arranged over the edge or rim 2 of the mouth or neck of the bag or reservoir 1, as illustrated in said Fig. 4. If desired, a hook 20 may be secured directly upon the side of the bag or reservoir 1, as represented in Fig. 6, in this case being provided with a collar or band 21, having an eye 22, to which is secured a ring 23, adapted to be placed over the said hook 20 when the nozzle portion of the tube or hose 6 is to be arranged in its suspended position.

From the above description of my invention it will be seen that I have devised a simple device for retaining the nozzle portion of the flexible tubing or hose of a fountain-syringe in its raised and suspended position at the side of the bag or reservoir at or near the rim or edge which surrounds the mouth or neck of the bag or at any other desirable part of the bag without any danger of kinking the tubing or hose, whereby the latter is often weakened and rendered useless in a short time, and, furthermore, I have provided an easily-operated shut-off or compression-clamp for readily shutting off the flow of the liquid through the said tubing, the said suspension device being used either with or without the said shut-off or compression-clamp, as may be desired.

I am aware that changes may be made in the arrangements and combinations of the devices and the parts thereof without departing from the scope of my invention. Hence I do not limit my invention to the exact arrangements and combinations of the devices and their parts as described in the present specification and as illustrated in the accompanying drawings, nor do I confine myself to the details of the construction of the parts thereof.

Having thus described my invention, what I claim is—

1. In a fountain-syringe, the combination, with the reservoir and its flexible tubing, of a hook for suspending said tubing from the mouth of the reservoir, and a compression-clamp, comprising, a back plate, a spring-tongue connected with said back plate, and a clamping-lever in operative engagement with said spring-tongue, substantially as and for the purposes set forth.

2. In a fountain-syringe, the combination, with the reservoir and its flexible tubing, of a combined compression-clamp and suspension device for suspending said tubing from the mouth of the reservoir, comprising, a back plate, a hook connected with said back plate, a spring-tongue connected with said back plate, and a clamping-lever in operative engagement with said spring-tongue, substantially as and for the purposes set forth.

3. In a fountain-syringe, the combination, with the reservoir and its flexible tubing, of a combined compression-clamp and suspension device for suspending said tubing from the mouth of the reservoir, comprising, a back plate, a means of suspension connected with said clamp, a spring-tongue connected with said back plate, and a clamping-lever in operative engagement with said spring-tongue, substantially as and for the purposes set forth.

4. The herein-described combined compression-clamp and suspension device, comprising, a back plate, a hook connected with said back plate, a spring-tongue connected with said back plate, and a clamping-lever in operative engagement with said spring-tongue, substantially as and for the purposes set forth.

In testimony that I claim the invention set forth above I have hereunto set my hand this 8th day of September, 1902.

JAMES HARDMAN, Jr.

Witnesses:
GEO. D. RICHARDS,
WILL C. HEADLEY.